United States Patent [19]
Seegopaul

[11] Patent Number: 5,869,019
[45] Date of Patent: *Feb. 9, 1999

[54] SYNTHESIS OF PHASE STABILIZED VANADIUM AND CHROMIUM CARBIDES

[75] Inventor: Purnesh Seegopaul, Flemington, N.J.

[73] Assignee: Nanodyne Incorporated, New Brunswick, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 720,635

[22] Filed: Oct. 2, 1996

[51] Int. Cl.⁶ .................................................. C01B 31/34
[52] U.S. Cl. .............................................. 423/440; 501/93
[58] Field of Search ................................ 423/440; 501/93

[56] References Cited

U.S. PATENT DOCUMENTS

| | | | |
|---|---|---|---|
| 3,803,056 | 4/1974 | Hart | 423/440 |
| 3,872,136 | 3/1975 | Middelhoek | 423/440 |
| 4,948,762 | 8/1990 | Krumbe et al. | 423/345 |
| 5,068,148 | 11/1991 | Nakahara et al. | 51/307 |
| 5,427,761 | 6/1995 | Grindatto et al. | 423/440 |

FOREIGN PATENT DOCUMENTS 1508370  11/1967  France .
1540985   8/1968  France .

Primary Examiner—Michael Lewis
Assistant Examiner—Stuart L. Hendrikson
Attorney, Agent, or Firm—Wood, Herron & Evans, LLP

[57] ABSTRACT

In order to eliminate the oxygen sensitivity of chromium carbide and vanadium carbide particles, vanadium carbide and chromium carbide particles are formed by carburizing a precursor compound at a elevated reaction temperature of about 950° C. Initially, the precursor compound is heated in an inert nitrogen-containing gas to the reaction temperature. Once the reaction temperature is achieved, hydrogen and a carbon-containing gas such as methane or ethylene are used to conduct the carbonization. After the carbonization has been completed, the carbonizing gas is then replaced with an inert nitrogen-containing gas and the product allowed to cool down. The carbonization cycle is adjusted so that the oxygen level is kept to less than 0.35%, while the nitrogen level is kept at about 2%. Powders produced from this process show minimal or no oxygen pickup when exposed to ambient air.

11 Claims, No Drawings

SYNTHESIS OF PHASE STABILIZED VANADIUM AND CHROMIUM CARBIDES

BACKGROUND OF THE INVENTION

Metal carbides are used for a variety of different applications. Some metal carbides are used as abrasive materials, while others such as vanadium and chromium carbide are grain growth inhibitors. For the most part, these carbides are formed by reacting either the elemental metal or the oxide with carbon at relatively high temperatures—anywhere from 1500° to 1800° C.

Current commercial grades of vanadium carbide and chromium carbide have a high oxygen sensitivity. This sensitivity increases as the grain size is reduced and it is not uncommon to measure oxygen levels greater than 1% in vanadium carbides exposed to air. Vanadium and chromium carbides are used as grain growth inhibitors in the manufacture of tungsten carbide-cobalt hardmetals. Oxidation of vanadium and chromium presents difficulties in processing of tungsten carbides in that these oxides are not easily reduced at low temperatures. Reduction occurs at temperatures greater than 800° C. and results in carbon loss and porosity through out-gassing.

SUMMARY OF THE INVENTION

It is accordingly an object of the present invention to provide a method to form carbides of chromium or vanadium which are not oxygen sensitive. Further, it is an object of the present invention to provide a method to form VC and $Cr_3C_2$ with a high $N_2$ content.

The objects and advantages of the present inventions are achieved by heating Cr or V precursor compositions to a reaction temperature in a nitrogen environment and then reacting the chromium or vanadium in the presence of a carbonizing gas. The carbon-containing gas preferably contains no oxygen, containing only carbon and hydrogen. The carbonizing gas is in turn mixed with hydrogen and possibly in addition with an inert gas such as nitrogen, helium, or argon. This forms VC and/or $Cr_3C_2$ which is then cooled down in a nitrogen environment. This provides VC and/or $Cr_3C_2$ with a nitrogen content of greater than 1% and oxygen content less than 0.5%.

The objects and advantages of the present invention will be appreciated in light of the following detailed description and drawings in which:

DETAILED DESCRIPTION

According to the present invention, the carbides of chromium or vanadium are formed by carbonization of precursor compositions. The precursor compositions can be any solid composition which includes one of the subject metals, chromium or vanadium, wherein the composition includes no elements other than carbon, hydrogen, nitrogen or oxygen. Primarily, these precursor compositions should not include other metals or ceramics unless they would be desired in the end product.

Organometallic compositions are particularly suitable, as well as the ammonium salts of these materials such as ammonium vanadate. Other exemplary precursor compositions include chromium acetate hydroxide and chromic oxide or vanadium oxide compounds.

While precursor powders with large particles may be used, it is preferable that the particle size of the precursor compositions be as small as possible and preferably less than about 100 microns in size. This can be achieved by grinding or spray drying to form the desired particle size. When spray drying is employed, the precursor composition is dissolved in a solvent such as water and spray dried to form small particles.

The particulate precursor composition is subjected to a simultaneous reduction/carbonization. The reactor for this carbonization can be any of a variety of different reactors such as a fluidized bed reactor, a rotating bed reactor or a tubular reactor with a fixed bed. The particular selection of the reactor is not critical for the present invention.

Initially the precursor vanadium or chromium compositions are heated to a reaction temperature in an inert gas primarily formed from nitrogen. A portion of the gas can be other inert gases, particularly helium or argon, but this will include at least about 20% and preferably 50% nitrogen by volume, and will contain no oxygen. The reaction temperature will be established at from about 800° C. to about 1100° C. After the precursor is heated to the reaction temperature in the presence of the nitrogen-containing gas, the carburizing gas is introduced into the reactor and replaces the inert nitrogen-containing gas.

The carburizing gas should be a composition formed only from carbon and hydrogen. These gases include lower molecular weight hydrocarbons such as methane, ethane, propane, butane, ethylene, butene, acetylene and the like. This is combined with hydrogen and/or inert diluent gases. Inert gases which can be used as diluents include nitrogen, helium, and argon. These compositions contain no oxygen or other interfering elements. Preferably, this gas will have a carbon activity of at least about 2.

The time of the reaction will vary widely, depending upon the quantity of precursor composition used, the depth of the bed, and the type of reactor. In a fluidized bed reactor, a relatively short period of time—less than 8 hours—can be utilized, whereas in a fixed bed reactor the time may be from 4 to 16 hours, depending upon how long it takes to achieve infiltration of the carbonizing gas into the precursor composition, the size of the batch, and flow rate of the gases.

The formed carbide particles will have a nitrogen content of 1% to 3% and an oxygen content preferably less than 0.5% for vanadium and an oxygen content less than about 0.6% and nitrogen content greater than 1% for chromium.

The formed metal carbide particles will have a grain size less than a micron, making this particularly useful for mixing with other compositions, as well as for use in cutting tools and the like. Further, the particles themselves are highly friable, which further ensures uniform dispersion of the carbide grains during milling.

The advantages of the present invention will be further appreciated in light of the following detailed examples.

EXAMPLE 1

10 pounds of ammonium metavanadate were loaded onto trays in a tubular furnace and calcined for 4 hours in a nitrogen atmosphere at 800° C. After calcination, the nitrogen was replaced with hydrogen/10% methane and carburization was conducted for 16 hours. Excess carbon (free) was removed by flowing hydrogen alone for a few hours. Analysis showed the following:

| | |
|---|---|
| Oxygen | < 0.5% |
| Nitrogen | 3.5% |
| Grain Size | < 1 $\mu$ |

Cooling was then done in nitrogen.

Thus, by utilizing the present invention, one can make submicron particles including vanadium, chromium carbide and mixtures thereof. These particular carbides are, in turn, useful in virtually every application where these carbides have been previously used. Due to their particle size, they can be easily mixed and are more effective. These carbides further are not oxygen sensitive. Therefore, they do not take up oxygen when exposed to ambient environment. This, in turn, permits them to be sintered without losing strength.

This has been a description of the present invention, along with the presently known preferred method of practicing the present invention. However, the invention itself should only be defined by the appended claims wherein

We claim:

1. A method of forming carbide particles selected from the group consisting of vanadium carbide, chromium carbide and mixtures thereof comprising:

heating a precursor compound to a reaction temperature in an inert nitrogen-containing atmosphere said inert nitrogen-containing atmosphere containing substantially no carburizing gas wherein said precursor compound contains a metal atom selected from the group consisting of vanadium, chromium and mixtures thereof;

carburizing said precursor compound by replacing said inert nitrogen-containing atmosphere with a hydrocarbon-carburizing gas, and reacting said precursor for a time effective to form metal carbides.

2. The method claimed in claim 1 further comprising cooling said formed metal carbides in an inert nitrogen-containing gas.

3. The method claimed in claim 1 wherein said inert nitrogen-containing atmosphere has at least 50% nitrogen by volume.

4. The method claimed in claim 3 wherein said carburizing gas is selected from the group consisting of methane, ethane, propane, butane, butene, ethylene and acetylene.

5. The method claimed in claim 2 wherein said reaction temperature is at least about 800° C.

6. The method claimed in claim 2 wherein said time is at least about 4 hours.

7. The method claimed in claim 1 wherein said precursor compound is selected from the group consisting of elemental vanadium, elemental chromium, vanadium nitrate, chromium nitrate, ammonium vanadate, chromium acetate hydroxide, oxides of vanadium, and oxides of chromium.

8. The method claimed in claim 6 wherein said carburizing gas has a carbon activity of at least about 2.

9. The method claimed in claim 8 wherein said hydrocarbon carburizing gas is a mixture of a hydrocarbon gas and hydrogen.

10. The method claimed in claim 9 wherein said carburizing gas further includes an inert diluent selected from the group consisting of nitrogen, helium and argon.

11. A method of forming carbide particles selected from the group consisting of vanadium carbide and chromium carbide said carbide particles having an oxygen content less than 0.6% comprising heating a precursor compound to a reaction temperature of at least about 800° C. in an inert nitrogen-containing atmosphere having at least about 50% nitrogen and substantially no carburizing gas, wherein said precursor compound contains a metal selected from the group consisting of vanadium and chromium;.

carburizing said precursor compound by replacing said inert nitrogen-containing atmosphere with a carburizing gas comprising a combination of hydrogen and a hydrocarbon gas, and reacting said precursor for at least about 8 hours at 950° C. to form metal carbide particles;

cooling said metal carbide particles in an inert nitrogen-containing atmosphere having at least 50% nitrogen.

* * * * *